2,752,817
PHOTOGRAPHIC EXPOSURE FRAME

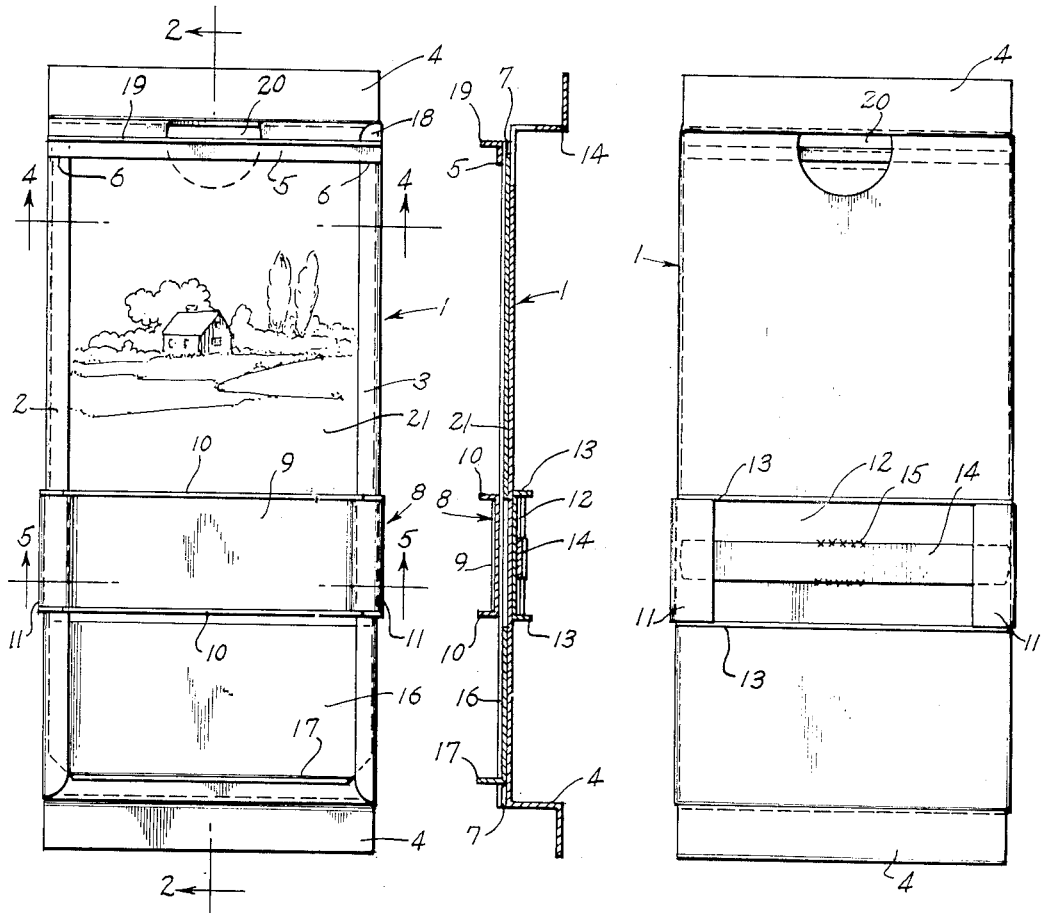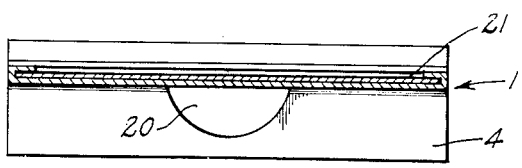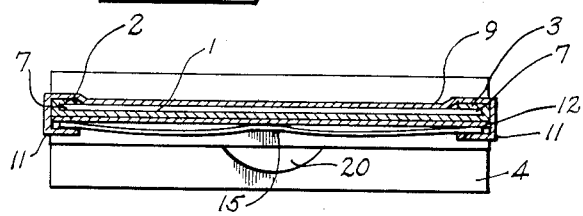

Leo P. Waschle and Raymond A. Griffith, Lincoln, Ill.

Application February 26, 1954, Serial No. 412,854

2 Claims. (Cl. 88—24)

This invention relates to improvements in photographic exposure frames of the type used in developing, printing or enlarging photographs.

An object of the invention is to provide a photographic exposure frame which is handy to use, which may be readily used in total darkness, and which will guide the photographic paper to its proper position of exposure within the frame and facilitate its removal from the frame after exposure.

Another object of the invention is to provide a photographic exposure frame which facilitates the making of uniform borders upon the photographs produced.

A further object of the invention is to provide a photographic exposure frame which can be quickly and easily adjusted for various lengths of photographs.

Other objects and advantages of the invention will appear from the following description considered in conjunction with the drawing, in which:

Figure 1 is a top plan view of a photographic exposure frame of the present invention.

Figure 2 is a sectional view taken along the line 2—2 of Figure 1.

Figure 3 is a bottom plan view of the present invention.

Figure 4 is a sectional view along the line 4—4 of Figure 1.

Figure 5 is a sectional view along the line 5—5 of Figure 1.

Referring now to the drawings in more detail, the illustrated device comprises rectangular base plate 1, fabricated of stainless steel, plastic or other suitable rigid material, which carries a pair of opposed longitudinal masking flanges 2 and 3 spaced above the plate 1. The flanges 2 and 3 are formed by the turning upwardly and inwardly toward the face of the plate 1 of opposed longitudinal edge portions of the plate 1. The opposed end portions of the plate 1 are turned downwardly and outwardly to form feet 4 for elevating the plate 1 above the level of a supporting surface.

A third transverse masking strip 5 extends between the opposed masking flanges 2 and 3, and is fixed to the upper surfaces thereof, as indicated at 6, and is spaced above the face of the plate 1. The space between the flanges 2 and 3, the strip 5, and the plate 1, designated 7, forms a slideway for receiving the sheet of photographic paper 21 to be exposed when inserted within said slideway 7, the flanges and the strip serving to mask marginal portions of two side edges and one end of the paper.

Extending transversely of the plate 1 and of the flanges 2 and 3 and surmounting them is a longitudinally slidable masking member or mask 8. The mask 8 is provided to mask the remaining end of a piece of paper 21 placed within the slideway 7. Movement of the mask 8 toward or away from the strip 5 will decrease or increase the length of the exposed area of the paper 21.

The mask 8 consists of a strip 9, fabricated of stainless steel, plastic or other suitable rigid material and positioned above the plate 1. The strip 9 is flanged upwardly along the greater portion of its opposed side edges, as shown at 10, and its end portions 11 are bent downwardly and inwardly about the flanges 2 and 3 to form hook flanges which terminate beneath the underside of the plate 1. Between its end portions 11 the strip 9 is depressed slightly toward the plate 1 to reduce the clearance between the underside of the strip 9 and the face of the plate 1 to the extent that the slide will prevent the underlying portion of a sheet of photographic paper from lifting or wrinkling and keep it flatly against the plate 1 but will not prevent the strip 9 from sliding freely over the paper.

The mask 8 further comprises another strip 12 lying transversely of the under side of the plate 1 with its ends within the flange portions 11 of the strip 9. The strip 12 is somewhat wider than strip 9 and its side edges are bent downwardly to form flanges 13 which abut the adjacent edges of the flange portion 11. The strip 12 is held flush against the under side of the plate 1 by a leaf spring 14 interposed between said strip and the flange portions 11, the spring 14 being fixedly secured to the strip 12 at 15. The tension of the spring 13 thus serves to hold the strip 9 firmly though slidably against the upper surfaces of the flanges 2 and 3.

Traversing the face of the plate 1 and freely slidable in the slideway 7 and beneath the strip 9 of the mask 8, is an ejector 16 for removing a sheet of photographic paper from the slideway 7 after exposure. The ejector 16 consists of a flat plate of stainless steel, plastic or other suitable rigid material, having a portion of a side edge, remote from the strip 5, bent upwardly to form the flange 17, by which the ejector may be moved upon the face of the plate 1 to remove a sheet of paper from the slideway 7.

To facilitate the insertion of a sheet of photographic paper into the slideway 7, the end of the plate 3 adjacent the strip 5 is prolonged slightly to form the lip 18 and a side edge of the strip 5 adjacent the lip 18 is bent upwardly to form the flange 19. An aperture 20 cut in the upstanding portion of the foot 4 adjacent to the strip 5 and in the plate 1 serves as a finger opening through which the under side of the photographic paper may be grasped by the operator's finger when the paper is being inserted in or removed from the frame.

To use the present invention the photographic paper is first inserted. The flange 19 and the lip 18 guide the entering end of the paper into the slideway 7 until its following end is flush with the flange 19. The flanges 2 and 3, and the strip 5 then mask the side edges and one end edge of the paper, thereby assuring known and predetermined margins. The mask 8 is then moved along the flanges 2 and 3 to a position at which it masks the remaining end of the paper corresponding to the desired length of the area to be exposed. The upper surface of one or both of the flanges 2 and 3 may be graduated in order that the length of the exposed area may be read directly. As the paper is inserted in the slideway 7 the entering end of the paper pushes the ejector 16 along the plate 1 so as to afford space upon the face of the plate 1 for the entire sheet. When the exposure has been completed the ejector 16 is moved in the opposite direction by manual pressure upon the flange 17 and forces the paper from the slideway 7. As the end of the paper projects from the end of the plate 1 the operator may insert fingers through the aperture 20 and draw the paper the rest of the way out between finger and thumb.

From the foregoing it will be seen that the frame of the present invention is handy to use. The provision for ready insertion and withdrawal of the paper makes possible its use in the complete darkness of the dark room. Moreover, the flanges 2 and 3, and the strip 5 provide predetermined margins for the exposed area, and the mask 8 provides for the ready adjustment of the length of the exposed area.

What is claimed is:

1. In a photographic exposure frame, an elongated rectangular base plate having longitudinal side edges and first and second end edges, said base plate having an underside and an upper face, flange elements on said side edges having longitudinal side flanges overlying the upper face of the base plate, a movable mask comprising an upper strip extending between and slidably overlying said side flanges, said upper strip having side edges having hook flanges thereon slidably embracing said flange elements of the base plate, said hook flanges including longitudinal flanges spaced beneath the upper strip and positioned beneath the base plate, said upper strip being spaced above the upper face of the base plate, said mask further comprising a lower strip engaged with the underside of the base plate, said lower strip having side edges engaged in said hook flanges, means acting between said lower strip and said hook flanges preventing relative movements of the lower strip and the upper strip along the base plate, and a bowed leaf spring underlying said lower strip and having an intermediate portion secured to the lower strip and end portions engaged in said hook flanges between the lower strip and said longitudinal flanges of the hook flanges.

2. In a photographic exposure frame, an elongated rectangular base plate having longitudinal side edges and first and second end edges, said base plate having an underside and an upper face, flange elements on said side edges having longitudinal side flanges overlying the upper face of the base plate, a movable mask comprising an upper strip extending between and slidably overlying said side flanges, said upper strip having side edges having hook flanges thereon slidably embracing said flange elements of the base plate, said hook flanges including longitudinal flanges spaced beneath the upper strip and positioned beneath the base plate, said upper strip being spaced above the upper face of the base plate, said mask further comprising a lower strip engaged with the underside of the base plate, said lower strip having side edges engaged in said hook flanges, means acting between said lower strip and said hook flanges preventing relative movements of the lower strip and the upper strip along the base plate, and a bowed leaf spring underlying said lower strip and having an intermediate portion secured to the lower strip and end portions engaged in said hook flanges between the lower strip and said longitudinal flanges of the hook flanges, and an ejector plate slidably overlying the upper face of the base plate and having side edges slidably engaged beneath the side flanges of the base plate flange elements, and an upstanding element on said ejector plate for moving said ejector plate longitudinally of the base plate.

References Cited in the file of this patent

UNITED STATES PATENTS

| | | |
|---|---|---|
| 2,239,783 | Heitschmidt | Apr. 29, 1941 |
| 2,342,525 | Berry | Feb. 22, 1944 |
| 2,388,240 | Appling | Nov. 6, 1945 |
| 2,436,180 | Reany | Feb. 17, 1948 |
| 2,558,672 | Davies | June 26, 1951 |
| 2,589,094 | Konopka | Mar. 11, 1952 |
| 2,641,964 | Jaros | June 16, 1953 |